Patented Sept. 5, 1944

2,357,296

UNITED STATES PATENT OFFICE 2,357,296

IRON BLUE PIGMENT

Alfred E. Van Wirt and George F. Jones, Glens Falls, N. Y., assignors to Imperial Paper and Color Corporation, Glens Falls, N. Y., a corporation of New York No Drawing. Application November 14, 1942, Serial No. 465,635

12 Claims. (Cl. 106—304)

This invention relates to iron blue pigments, and has for its objects the provision of an improved pigment of this type and an improved method of making the same.

Iron blue pigments are customarily made by, first, the reaction of aqueous solutions of a soluble ferro-cyanide salt and a ferrous salt to form a bluish white precipitate (a ferrous ferro-cyanide) and, second, oxidizing the precipitate to ferric ferro-cyanide. The ferric ferro-cyanide (iron blue) pigments are widely used in the coating and printing ink fields, and while entirely satisfactory for most purposes, are deleteriously affected by alkalies. This susceptibility to the action of alkalies is evidenced by a serious discoloration of the pigment, and renders the pigment unsatisfactory for use in those fields in which it may come in contact with an alkali. The principal aim of the present invention is to provide an improved iron blue pigment highly resistant to the action of alkalies.

It has heretofore been proposed to overcome the susceptibility of iron blue pigments to the action of alkalies by treating the crude pigment with normal nickel salts at various stages in the manufacturing process. These prior proposals have not, we believe, made the most effective use of the nickel salt, since in certain cases subsequent washing of the still-acid pigment has resulted in substantial loss of the soluble nickel salt, and in those cases where it has been proposed to form in situ a basic insoluble nickel salt a delicate pH control is required, since too low a pH results in loss of nickel and failure to form the desired basic nickel salt and too high a pH is incompatible with the nature of the pigment.

We have discovered that a non-basic and even an acid nickel compound added to an iron blue pigment distinctly on the acid side imparts satisfactory alkali-resistance to the pigment. Based on this discovery, the pigment of the invention is characterized by the incorporation therein of a small amount of a non-basic nickel phosphate compound. The compound is preferably incorporated in the oxidized ferric ferro-cyanide after its final washing and initial dehydration. The nickel phosphate compound is wholly retained by the pigment and exercises no adverse influence or effect upon the color of the finished pigment, and may be regarded as an innocuous addition to the pigment unless and until it comes in contact with an alkali, when the presence of the nickel phosphate compound renders the pigment highly alkali-resistant.

The non-basic nickel phosphate compound may be conveniently prepared by the reaction in an acid solution of a water-soluble nickel salt, such as nickel sulphate, and a water-soluble phosphate, such as acid sodium phosphate. Although the resulting gelatinous precipitate need not be washed to produce good alkali resistance, it is advisable to wash the precipitate to remove the soluble salts which are deleterious for other reasons. The exact composition of the nickel phosphate compound precipitated from such an acid solution has not been determined. It is believed to be an acid nickel phosphate, although it may be a hydrated normal nickel phosphate. In any event, it definitely is not basic.

In carrying out the method of the invention, the usual procedure for making iron blue pigments is followed up to the final washing and initial dehydration of the pigment, which, at this stage, is a ferric ferro-cyanide. The initial dehydration is customarily a filtering operation, and the filter cake may contain from 20 to 40% of water, and is still acid with a pH of around 4. The non-basic nickel phosphate compound is added to the moist and acid filter cake and thoroughly and intimately mixed therewith. So far as can be determined, the nickel phosphate compound is not altered in composition, and is merely uniformly dispersed throughout the body of the iron blue pigment.

The non-basic nickel phosphate compound is preferably prepared by adding an aqueous solution of acid sodium phosphate to an aqueous solution of nickel sulphate. The reacting liquid medium is sharply acid. Upon mixing the aqueous solutions, a gelatinous precipitate of the nickel phosphate compound forms, and is separated from the reacting liquid medium and washed to remove soluble salts.

The nickel phosphate compound is conveniently added to the moist iron blue pigment in the form of an aqueous slurry. Sufficient of the compound is incorporated in the pigment to render the pigment highly resistant to the action of alkalies. Very satisfactory results are attained by using an amount of the compound equivalent to about 2% by weight of nickel based on the dry weight of the pigment. Larger amounts of the compound appear to be unnecessary, and smaller amounts may be used depending upon the degree of alkali-resistance desired in the finished pigment.

When the nickel phosphate compound has been intimately incorporated in the moist iron-blue pigment, the mixture is dried and finished in the customary manner. All of the added compound remains mixed with the finished pigment. The iron blue pigment of the invention is highly resistant to alkalies. It may be ground in oil and made into color ink like ordinary iron blues of the prior art. In fact, the new pigment of the invention is in every respect the equivalent of the heretofore normal corresponding iron blue pigment, but possesses the distinctive and advantageous characteristic of being highly resistant to alkalies.

We claim:

1. An iron blue pigment characterized by the incorporation therein of a non-basic nickel phosphate compound in amount sufficient to render the pigment resistant to the action of alkalies.

2. An alkali-resistant iron blue pigment characterized by the incorporation therein of about 2 percent of a non-basic nickel phosphate compound calculated as nickel on the dry weight of the pigment.

3. An alkali-resistant iron blue pigment characterized by the incorporation therein of a small amount of the precipitate product formed by the reaction in a sharply acid solution of a water-soluble nickel salt and a water-soluble phosphate.

4. An alkali-resistant iron blue pigment characterized by the incorporation therein of a small amount of the precipitate product formed by the reaction of aqueous solutions of acid sodium phosphate and nickel sulphate.

5. An alkali-resistant iron blue pigment characterized by the incorporation therein of about 2 percent (calculated as nickel on the dry weight of the pigment) of the precipitate product formed by the reaction of aqueous solutions of acid sodium phosphate and nickel sulphate.

6. An alkali-resistant iron blue pigment characterized by the incorporation therein of about 2 percent (calculated as nickel on the dry weight of the pigment) of the precipitate product formed by the reaction in a sharply acid solution of a water-soluble nickel salt and a water-soluble phosphate.

7. In the method of making an iron blue pigment in which a ferrous ferro-cyanide precipitate is oxidized to form ferric ferro-cyanide, the improvement which comprises intimately mixing a small amount of a non-basic nickel phosphate compound with the washed and partially dehydrated ferric ferro-cyanide, and drying and finishing the resulting mixture.

8. In the method of making an iron blue pigment in which a ferrous ferro-cyanide precipitate is oxidized to form ferric ferro-cyanide, the improvement which comprises intimately mixing a small amount of a precipitate product formed by the reaction in a sharply acid solution of a water-soluble nickel salt and a water-soluble phosphate with the washed and partially dehydrated ferric ferro-cyanide, and drying and finishing the resulting mixture.

9. In the method of making an iron blue pigment in which a ferrous ferro-cyanide precipitate is oxidized to form ferric ferro-cyanide, the improvement which comprises preparing an aqueous slurry of a non-basic nickel phosphate compound, intimately mixing a small amount of said slurry with the washed and partially dehydrated ferric ferro-cyanide, and drying and finishing the resulting mixture.

10. In the method of making an iron blue pigment in which a ferrous ferro-cyanide precipitate is oxidized to form ferric ferro-cyanide, the improvement which comprises preparing an aqueous slurry of a precipitate product formed by the reaction in a sharply acid solution of a water-soluble nickel salt and a water-soluble phosphate, intimately mixing about 2 percent of said slurry (calculated as nickel on the dry weight of the ferric ferro-cyanide) with the washed and partially dehydrated ferric ferro-cyanide, and drying and finishing the resulting mixture.

11. In the method of making an iron blue pigment in which a ferrous ferro-cyanide precipitate is oxidized to form ferric ferro-cyanide, the improvement which comprises intimately mixing a small amount of a precipitate product formed by the reaction of aqueous solutions of acid sodium phosphate and nickel sulphate with the washed and partially dehydrated ferric ferro-cyanide, and drying and finishing the resulting mixture.

12. In the method of making an iron blue pigment in which a ferrous ferro-cyanide precipitate is oxidized to form ferric ferro-cyanide, the improvement which comprises preparing an aqueous slurry of the washed precipitate formed by the reaction of aqueous solutions of acid sodium phosphate and nickel sulphate, intimately mixing about 2 percent of said slurry (calculated as nickel on the dry weight of the ferric ferro-cyanide) with the filter cake obtained after washing and filtering the ferric ferro-cyanide, and drying and finishing the resulting mixture.

ALFRED E. VAN WIRT.
GEORGE F. JONES.